US006883267B1

(12) United States Patent
Pruitt

(10) Patent No.: US 6,883,267 B1
(45) Date of Patent: Apr. 26, 2005

(54) MOBILE FISHING CADDY

(76) Inventor: Ronald Wayne Pruitt, 312 W. Castle St., Orlando, FL (US) 32809

( * ) Notice: Subject to any disclaimer, the term of this patent is extended or adjusted under 35 U.S.C. 154(b) by 0 days.

(21) Appl. No.: 10/233,946

(22) Filed: Sep. 3, 2002

(51) Int. Cl.⁷ ...................... A01K 97/06; A01K 97/10; A01K 97/22
(52) U.S. Cl. ................. 43/54.1; 280/47.19; 280/47.24; 280/47.26; 280/79.2; 280/79.3; 280/639; 280/652; 43/21.2
(58) Field of Search ............................... 43/54.1, 21.2; 280/47.17, 47.19, 47.26, 47.24, 79.11, 79.2, 280/79.3, 651, 652, 639

(56) References Cited

U.S. PATENT DOCUMENTS

| | | | | |
|---|---|---|---|---|
| 1,592,443 A | * | 7/1926 | Cornstock .................... | 43/54.1 |
| 1,962,454 A | * | 6/1934 | Meanor et al. ............. | 280/79.2 |
| 2,390,640 A | * | 12/1945 | Carlson ..................... | 280/47.19 |
| 2,493,084 A | * | 1/1950 | Pharo ......................... | 43/54.1 |
| 2,555,073 A | * | 5/1951 | Zdankoski .................. | 43/54.1 |
| 2,559,951 A | * | 7/1951 | Dunbar et al. ............... | 280/659 |
| 2,834,526 A | * | 5/1958 | Paris ........................... | 182/16 |
| 2,845,780 A | * | 8/1958 | Conklin et al. ............. | 280/79.3 |
| 2,905,480 A | * | 9/1959 | Giovannelli ............. | 280/47.19 |
| 2,922,487 A | * | 1/1960 | Reitknecht .................. | 182/16 |
| 3,144,014 A | * | 8/1964 | Mantell, Jr. ............... | 280/47.26 |
| 3,637,046 A | * | 1/1972 | Emmons ..................... | 182/170 |
| 3,815,933 A | * | 6/1974 | Olson ......................... | 280/79.3 |
| 3,834,725 A | * | 9/1974 | Olson ......................... | 280/79.3 |
| 3,874,531 A | * | 4/1975 | Mayo ......................... | 280/79.2 |
| 3,954,155 A | * | 5/1976 | Guidara ....................... | 280/30 |
| 3,997,181 A | * | 12/1976 | Jaco et al. ................. | 280/47.19 |
| 4,045,040 A | * | 8/1977 | Fails ............................... | 43/1 |
| 4,236,462 A | * | 12/1980 | Berthier et al. ............. | 280/651 |
| D264,888 S | * | 6/1982 | Watts .......................... | D34/26 |
| 4,355,818 A | * | 10/1982 | Watts ....................... | 280/47.19 |
| 4,494,626 A | * | 1/1985 | Ast ............................. | 280/30 |
| 4,632,412 A | * | 12/1986 | Nasgowitz ............... | 280/47.26 |
| 4,759,560 A | * | 7/1988 | Virgulti ................... | 280/47.26 |
| 4,841,661 A | * | 6/1989 | Moore ........................ | 43/54.1 |
| 4,865,346 A | * | 9/1989 | Carlile ....................... | 280/654 |
| 4,976,450 A | * | 12/1990 | Ellefson .................. | 280/79.11 |
| 5,005,847 A | * | 4/1991 | King et al. ............. | 280/47.19 |

(Continued)

FOREIGN PATENT DOCUMENTS

DE       3601224 B1  *  7/1987

(Continued)

Primary Examiner—Darren W. Ark
(74) Attorney, Agent, or Firm—Allen, Dyer, Doppelt, Milbrath & Gilchrist, P.A.

(57) ABSTRACT

A fishing caddy comprises a support frame having an upper end and a lower end and comprising a plurality of support members pivotably connected at the upper end to form an A-frame; at least one hinge member spaced apart from the upper end and hingedly connecting support members of the A-frame so as to allow closing the A-frame; at least one fishing rod holder disposed on the support frame for holding a fishing rod; at least one beverage holder positioned on the support frame for holding a beverage container; at least one equipment support shelf pivotably connected to the support frame for holding equipment thereon; at least one umbrella holder disposed on the support frame for holding an umbrella; and at least one wheel connected to the support frame adjacent the lower end so as to make the fishing caddy rollingly movable.

20 Claims, 7 Drawing Sheets

U.S. PATENT DOCUMENTS

| | | | | |
|---|---|---|---|---|
| D319,907 S | * | 9/1991 | Fountain | D34/26 |
| 5,100,198 A | * | 3/1992 | Baltzell | 43/54.1 |
| 5,159,777 A | * | 11/1992 | Gonzalez | 43/54.1 |
| 5,163,694 A | * | 11/1992 | Reichek | 280/47.26 |
| 5,192,092 A | * | 3/1993 | DiBenedetto | 280/47.19 |
| 5,203,815 A | * | 4/1993 | Miller | 43/21.2 |
| 5,303,941 A | * | 4/1994 | Volper et al. | 280/79.11 |
| 5,333,885 A | * | 8/1994 | Pullman | 280/47.19 |
| D357,783 S | * | 4/1995 | Jones | D34/26 |
| D372,350 S | * | 7/1996 | Olson | D34/26 |
| 5,566,960 A | * | 10/1996 | McCrory | 280/79.11 |
| D378,456 S | * | 3/1997 | Speicher | D34/24 |
| 5,611,170 A | * | 3/1997 | McGuff et al. | 43/54.1 |
| 5,636,852 A | * | 6/1997 | Sistrunk et al. | 280/47.19 |
| 5,806,827 A | * | 9/1998 | Gilmore | 43/21.2 |
| 6,076,298 A | * | 6/2000 | Teel | 43/54.1 |
| 6,082,757 A | * | 7/2000 | Lin | 280/47.26 |
| 6,113,129 A | * | 9/2000 | Marques et al. | 280/47.19 |
| 6,131,925 A | * | 10/2000 | Weldon | 280/47.26 |
| 6,158,749 A | * | 12/2000 | Roudebush | 280/47.16 |
| 6,196,560 B1 | * | 3/2001 | Ohlsson | 280/652 |
| 6,374,532 B1 | * | 4/2002 | Klein | 43/54.1 |
| 6,474,663 B1 | * | 11/2002 | Becker | 280/47.24 |
| 6,487,814 B1 | * | 12/2002 | Arredondo et al. | 43/54.1 |
| 6,490,823 B1 | * | 12/2002 | Ibarra | 43/21.2 |
| 6,702,608 B1 | * | 3/2004 | Brennan, Jr. | 280/47.19 |
| 6,742,789 B1 | * | 6/2004 | Nowak | 43/54.1 |

FOREIGN PATENT DOCUMENTS

| | | | | |
|---|---|---|---|---|
| DE | 3626574 B1 | * | 2/1988 | |
| DE | 4018948 B1 | * | 5/1991 | |
| DE | 29615424 B1 | * | 11/1996 | |
| DE | 29702185 B1 | * | 4/1997 | |
| DE | 29718553 B1 | * | 12/1997 | |
| DE | 19839672 B1 | * | 12/1999 | |
| EP | 388617 B1 | * | 9/1990 | |
| FR | 2683200 B1 | * | 5/1993 | |
| FR | 2755348 B1 | * | 5/1998 | |
| FR | 2760324 B1 | * | 9/1998 | |
| FR | 2777252 B1 | * | 10/1999 | |
| FR | 2784265 B1 | * | 4/2000 | |
| GB | 2298618 B1 | * | 9/1996 | |
| GB | 2372202 B1 | * | 8/2002 | |
| JP | 63-294725 B1 | * | 12/1988 | |
| JP | 11-69935 B1 | * | 3/1999 | |
| WO | WO-99/48744 B1 | * | 9/1999 | |

* cited by examiner

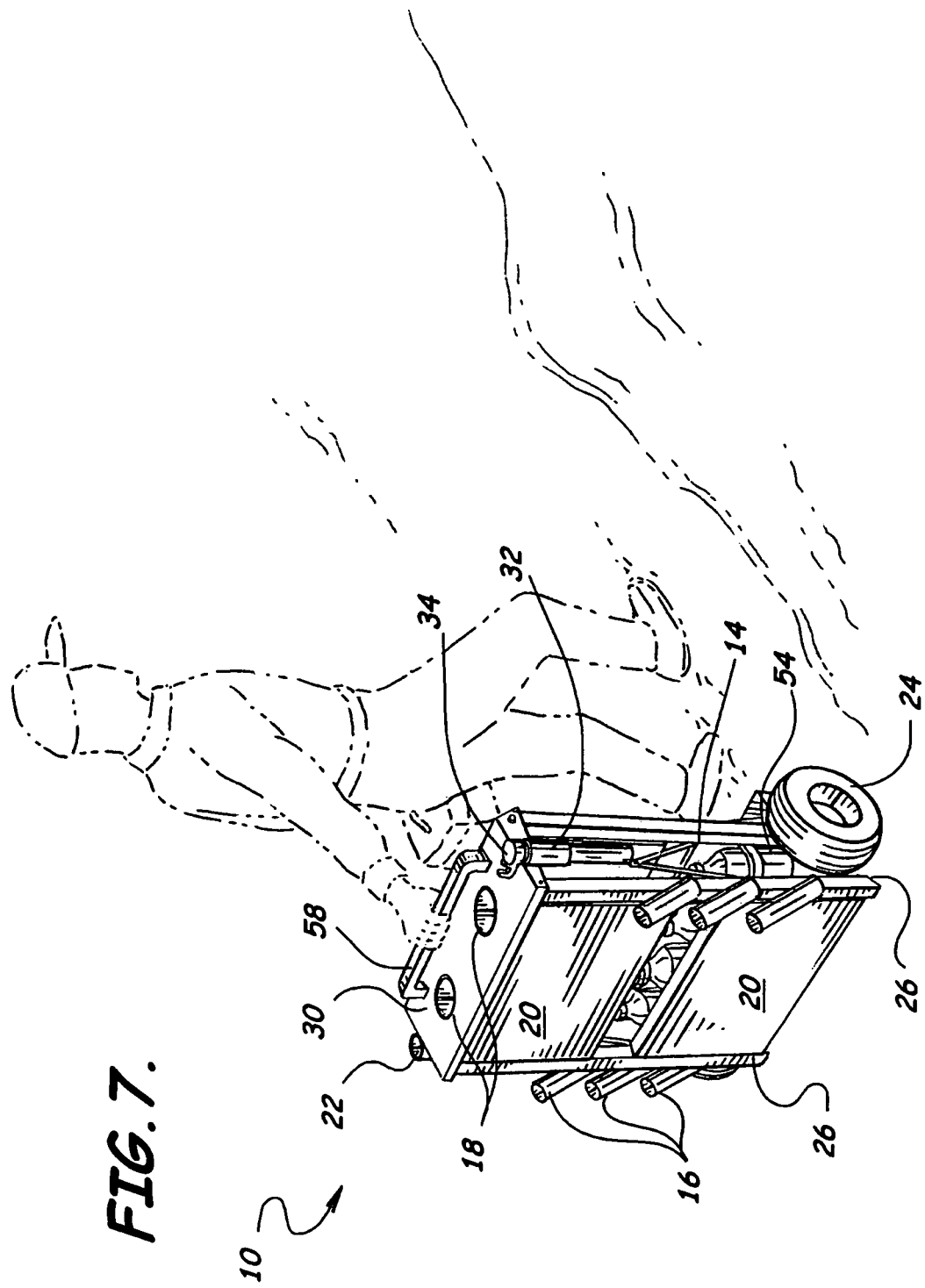

US 6,883,267 B1

MOBILE FISHING CADDY

FIELD OF THE INVENTION

The present invention relates to the field of fishing equipment and, more particularly, to a fishing caddy having a wheeled support A-frame which can be closed for moving or storage of the caddy.

BACKGROUND OF THE INVENTION

Fishing is a leisure activity which has become very popular in the U.S. Many fishermen have elaborately equipped boats from which to pursue their favorite sport fish, however, many more people will fish from the shore as it is more economical and may be more convenient. Onshore fishermen typically must carry a variety of equipment to their chosen fishing spot along the shore. Such equipment includes not only the fishing tackle, but may also include a cooler for holding food and beverages, a radio for entertainment, news, and weather warnings, perhaps a lantern or lamp if fishing after dark, and maybe even an umbrella to help protect the fisherman from the sun or, alternatively, from rain. Often times, the chosen fishing spot may be relatively distant from an adequate parking location and the fisherman must carry the equipment and supplies from a vehicle to the desired location. Various types of carts have been designed and are available for carrying the necessary equipment and supplies, and once set up on the beach or other fishing spot, for holding the fishing rod(s) so that the fisherman may relax while awaiting a bite. Nevertheless, none of the previously described fishing carts holds all the full range of accessories desired by the modern onshore fisherman.

SUMMARY OF THE INVENTION

With the foregoing in mind, the present invention advantageously provides a mobile fishing caddy which comprises a support frame having an upper end and a lower end and comprising a plurality of support members pivotably connected at the upper end to form an A-frame; at least one hinge member spaced apart from the upper end and hingedly connecting support members of the A-frame so as to allow closing the A-frame; at least one fishing rod holder disposed on the support frame for holding a fishing rod; at least one beverage holder positioned on the support frame for holding a beverage container; at least one equipment support shelf pivotably connected to the support frame for holding equipment thereon; at least one umbrella holder disposed on the support frame for holding an umbrella; and at least one wheel connected to the support frame adjacent the lower end so as to make the fishing caddy rollingly movable.

In another preferred embodiment, the fishing caddy includes a support frame having an upper end and a lower end and comprising at least two pairs of support members pivotably connected at the upper end to form an A-frame, each pair of support members connected for stability. Two hinge members are spaced apart from the upper end and connect the two pairs of support members so as to allow the A-frame to be closed. A plurality of fishing rod holders is disposed on the support frame for hold fishing rods. A plurality of support shelves pivotably connected to the support frame for thereon supporting equipment, the plurality of support shelves including a top shelf positioned at the upper end of the support frame and side shelves positioned spaced apart along side peripheries of the A-frame. A plurality of beverage holders is positioned on the caddy for holding beverage containers therein. An umbrella holder is disposed on the fishing caddy for holding an umbrella, and a plurality of wheels is connected adjacent the lower end of the support frame so as to make the fishing caddy rollingly movable.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 7 shows a perspective view of an embodiment of the caddy of FIG. 1 being transported in its folded position by a fisherman.

DETAILED DESCRIPTION OF THE PREFERRED EMBODIMENT

Figure 1:
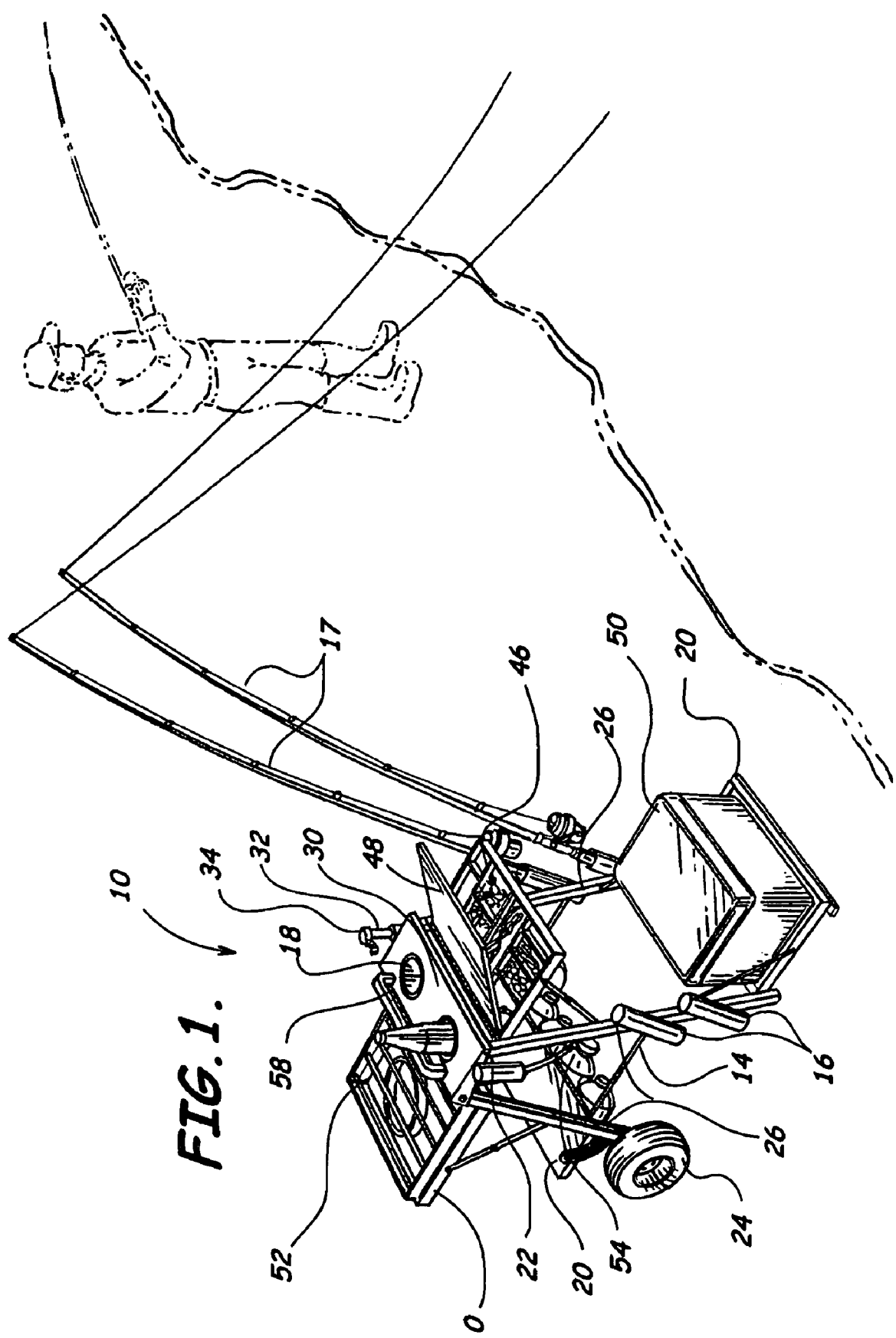
FIG. 1 is a perspective view of an embodiment of the present mobile fishing caddy in use along a shoreline.

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, the illustrated embodiments are provided so that this disclosure will be thorough and complete, and will fully convey the scope of the invention to those skilled in the art.

FIGS. 1–7 illustrate the fishing caddy of the present invention. The fishing caddy 10 comprises a support frame 12, a hinge member 14, a fishing rod holder 16, a beverage holder 18, an equipment support shelf 20, an umbrella holder 22, and at least one wheel 24 for moving the caddy thereon. The support frame, best shown in FIGS. 3–5, has an upper end and a lower end and comprises a plurality of support members 26 pivotably connected at the upper end to generally form an A-frame. At least one hinge member 14 is positioned spaced apart from the upper end of the support A-frame and is hingedly connected to support members of the A-frame 12 so as to allow closing the A-frame in the manner of a typical step ladder. A latch 28 device is preferably positioned on the support frame for latching the A-frame in a closed position. At least one fishing rod holder 16 is disposed on the support frame 12 for holding a fishing rod 17. At least one beverage holder 18 is also positioned on the support frame 12 for holding a beverage container. An equipment support shelf 20, at least one, is pivotably connected to the support frame 12 for holding equipment thereon and swings from an open or working position extending away from the frame to a closed position toward the frame. The umbrella holder 22 is disposed on the support frame 12 for holding an umbrella. One preferred arrangement for the umbrella holder includes a tube secured to the frame of the fishing caddy, the tube being sufficient for therein receiving the umbrella post and to provide support for the open umbrella, as shown in FIGS. 1–2, 4 and 6. An alternative arrangement for the umbrella holder (not shown) includes a first opening on an upper surface of the fishing caddy, for example on a top shelf of the caddy, this first opening guiding an umbrella post positioned therethrough to be aligned with a frame hinge member or other portion of the caddy support frame to tie thereto so as to provide sufficient support for holding a large umbrella open. These embodiments of the invention also include at least one wheel is connected to the support frame adjacent the lower end so as to make the fishing caddy rollingly movable, as seen in FIGS. 1–7.

Figure 3:
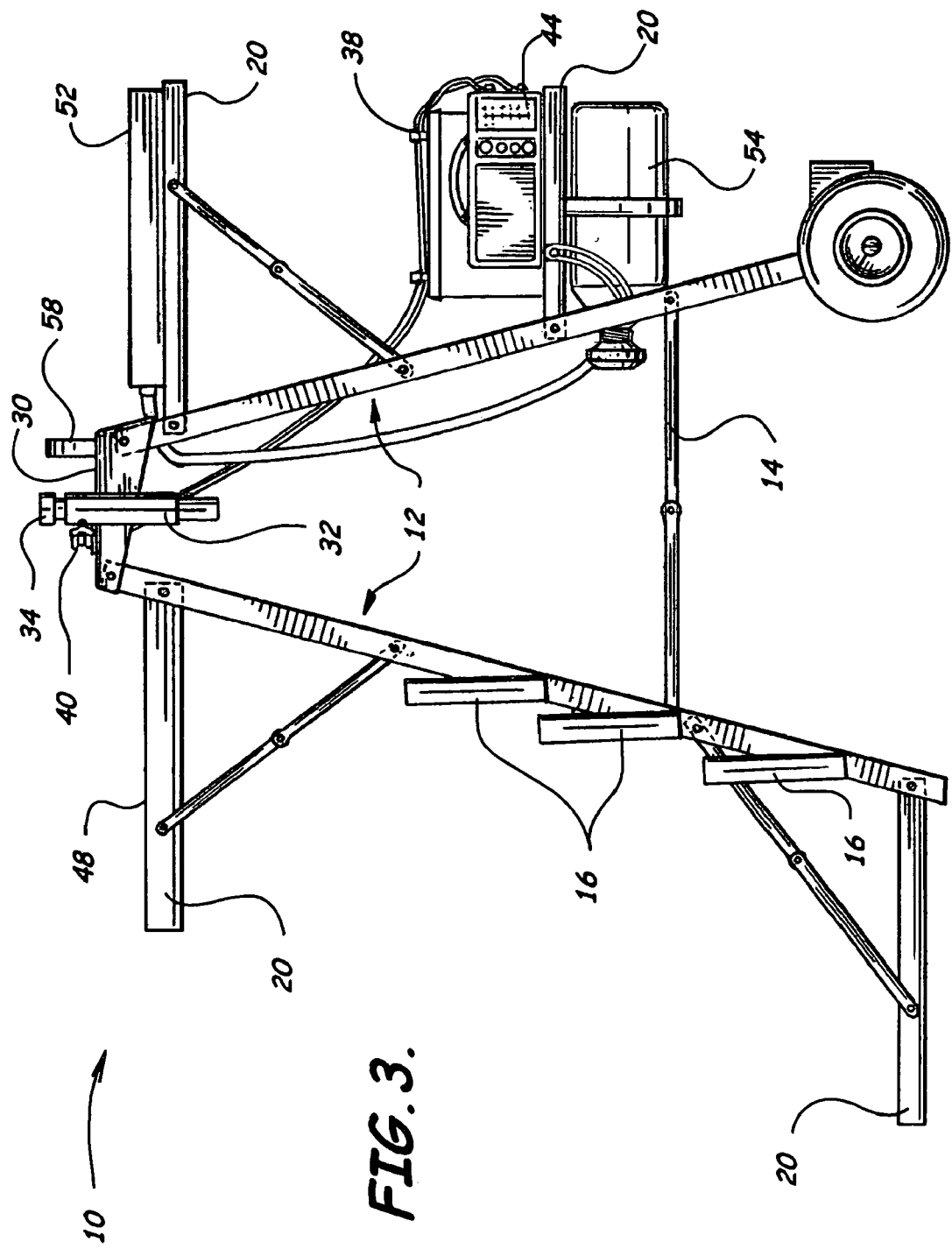
FIG. 3 is a side elevation of an embodiment of the caddy of FIG. 1.
Figure 4:
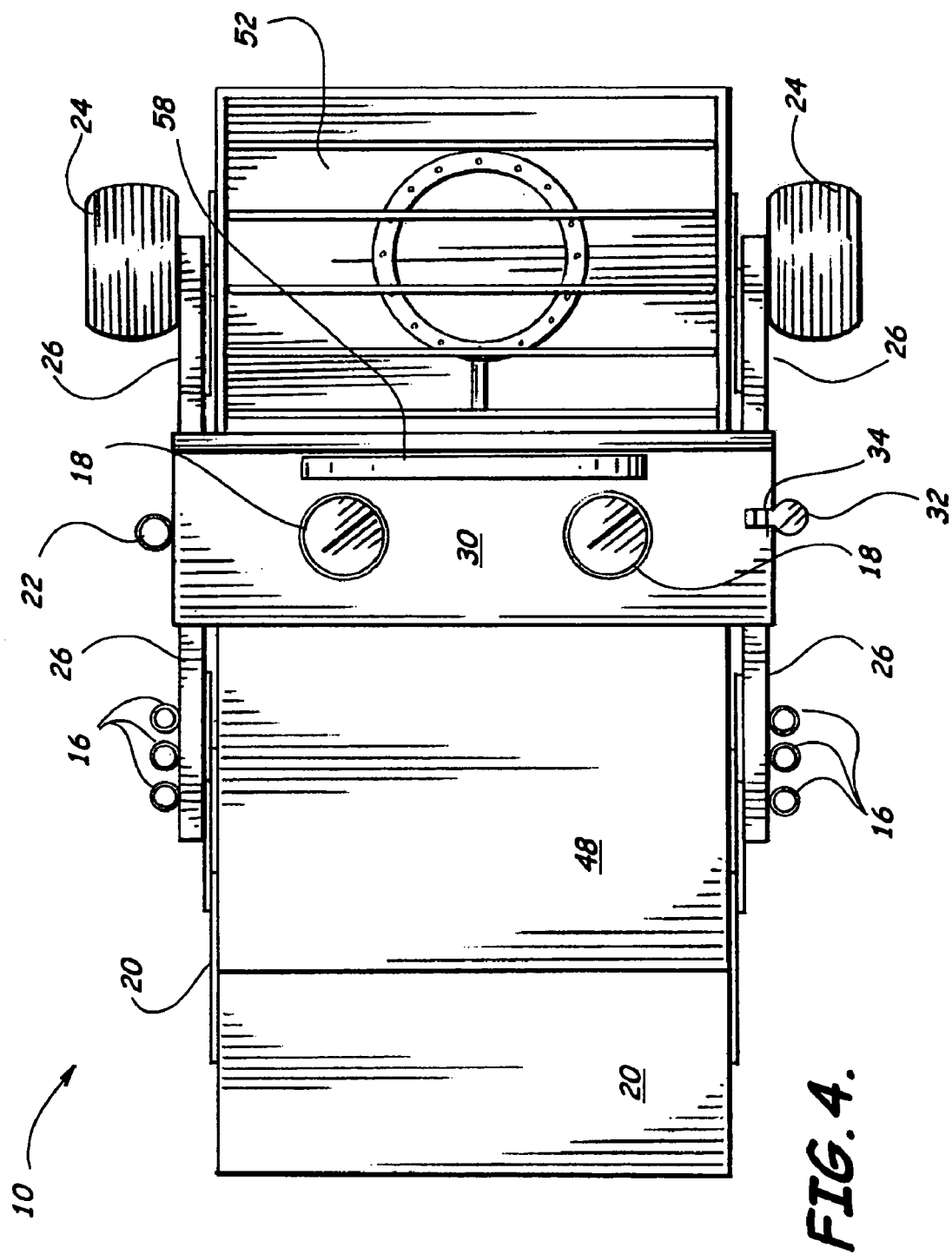
FIG. 4 shows a top plan view of an embodiment of the fishing caddy of FIG. 1.
Figure 5:
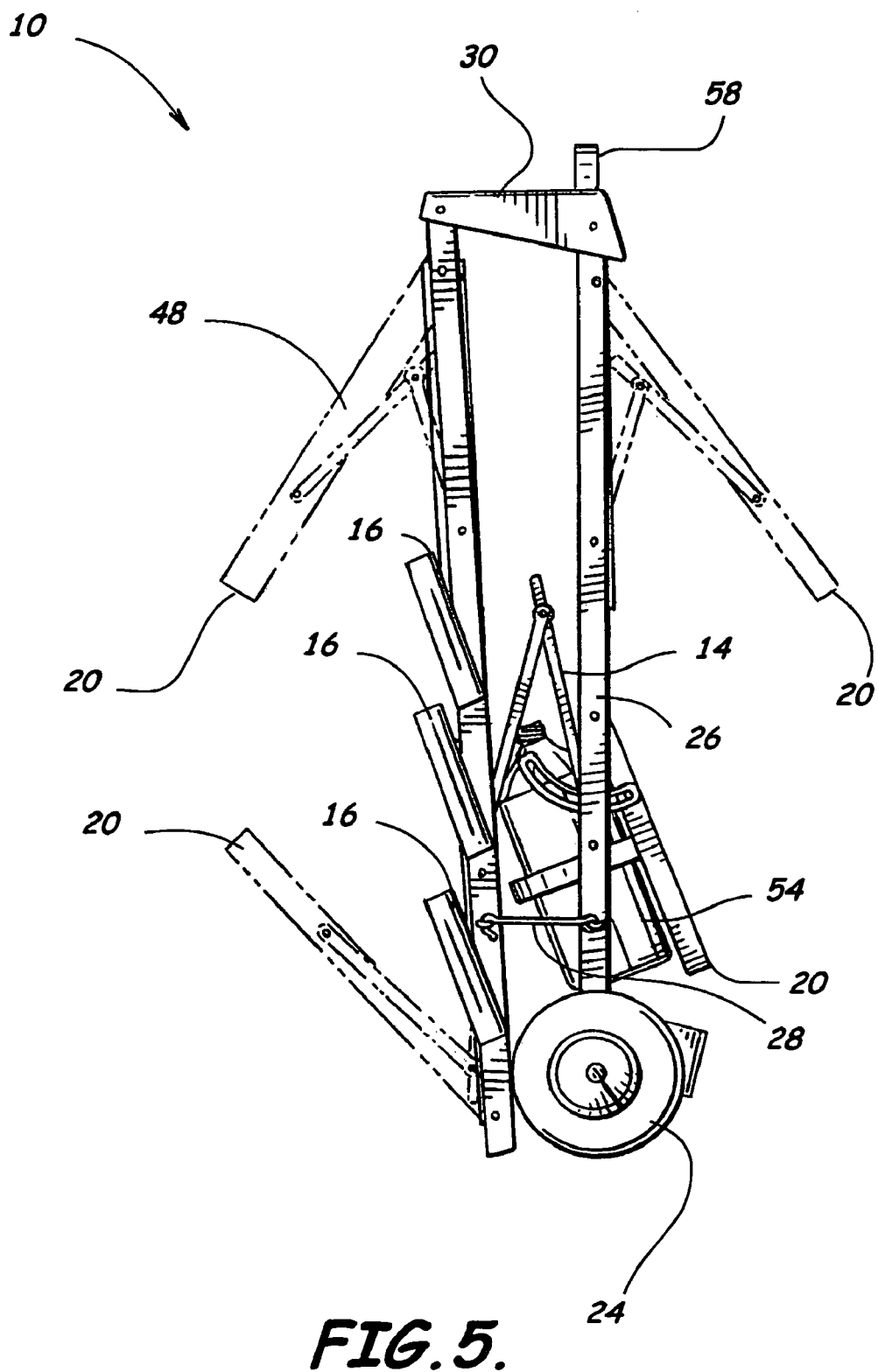
FIG. 5 illustrates a side elevation of an embodiment of the fishing caddy of FIG. 1 in its folded position.

As shown in FIGS. 3 and 5, the fishing caddy support frame 12 preferably further comprises a top shelf 30 positioned at the upper end of the support frame to provide the pivotal connection for the plurality of support members. In a preferred embodiment of the invention, the beverage holder 18 comprises a receptacle positioned on the top shelf 30 for therein receiving a beverage container. Best shown in FIG. 6, a lantern support member 32 is advantageously positioned on the support frame 12 to support a lantern 33 thereon, and preferably comprises an extendable S-hook 34 on which to hang the lantern. Additionally, or alternatively, a holder 36 could be provided for a light source such as the spotlight 42 also illustrated in FIG. 6, the holder preferably positioned toward the upper end of the caddy support frame to provide some elevation for the light.

Figure 6:
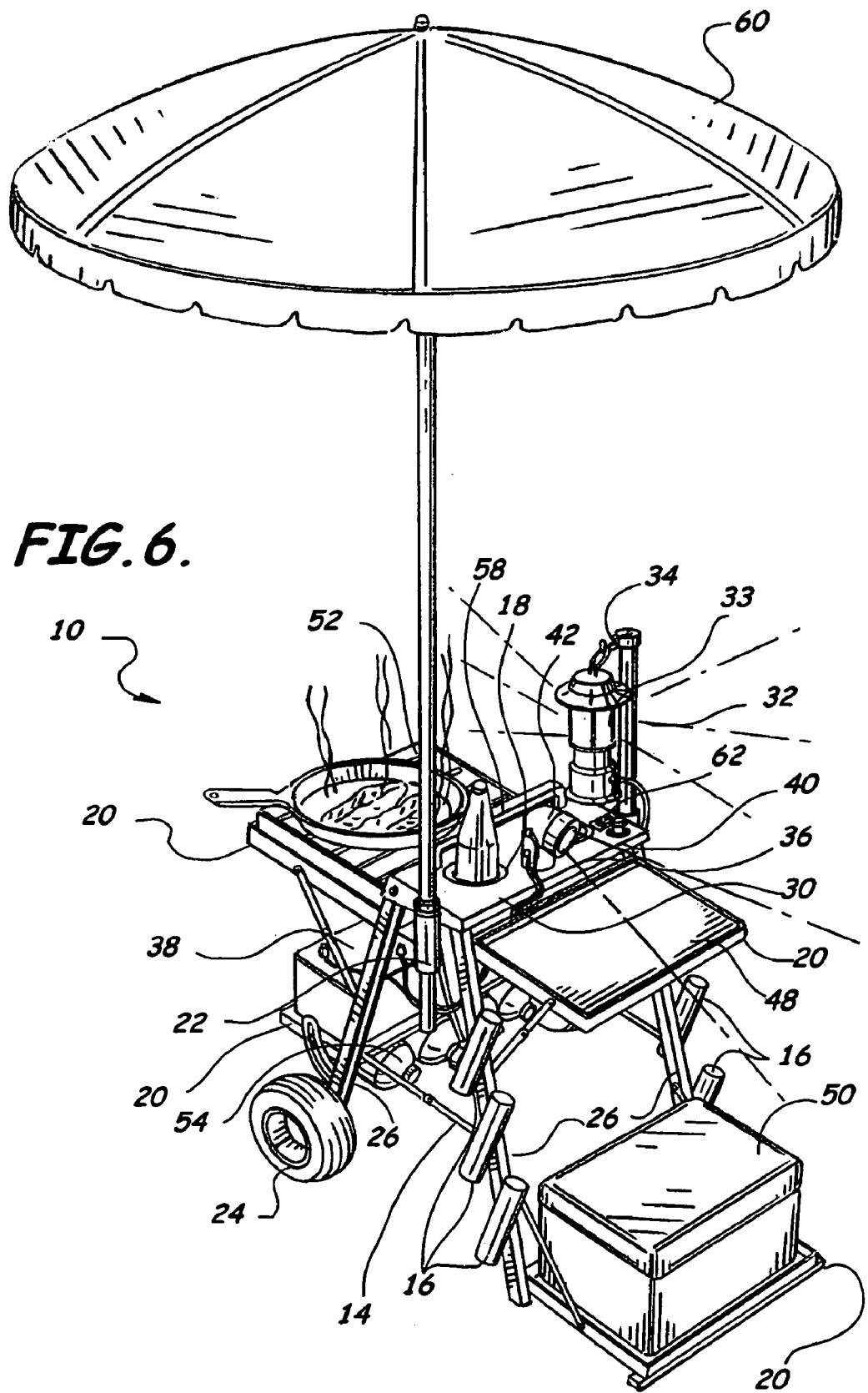
FIG. 6 is an overall perspective view of an embodiment of the present fishing caddy with various features shown in operation.

For powering electrical devices which the fisherman may wish to use, yet another embodiment of the present fishing caddy may also further comprise a power source 38 having a power outlet connected to provide power for an electrical accessory, as seen in FIGS. 3 and 6. In one embodiment, the power source includes a power outlet such as a cigarette lighter connected thereto, as shown in FIGS. 3 and 6, and may also include a connected light source 42 for providing illumination, a radio 44 for entertainment, or other electrical accessories.

Figure 2:
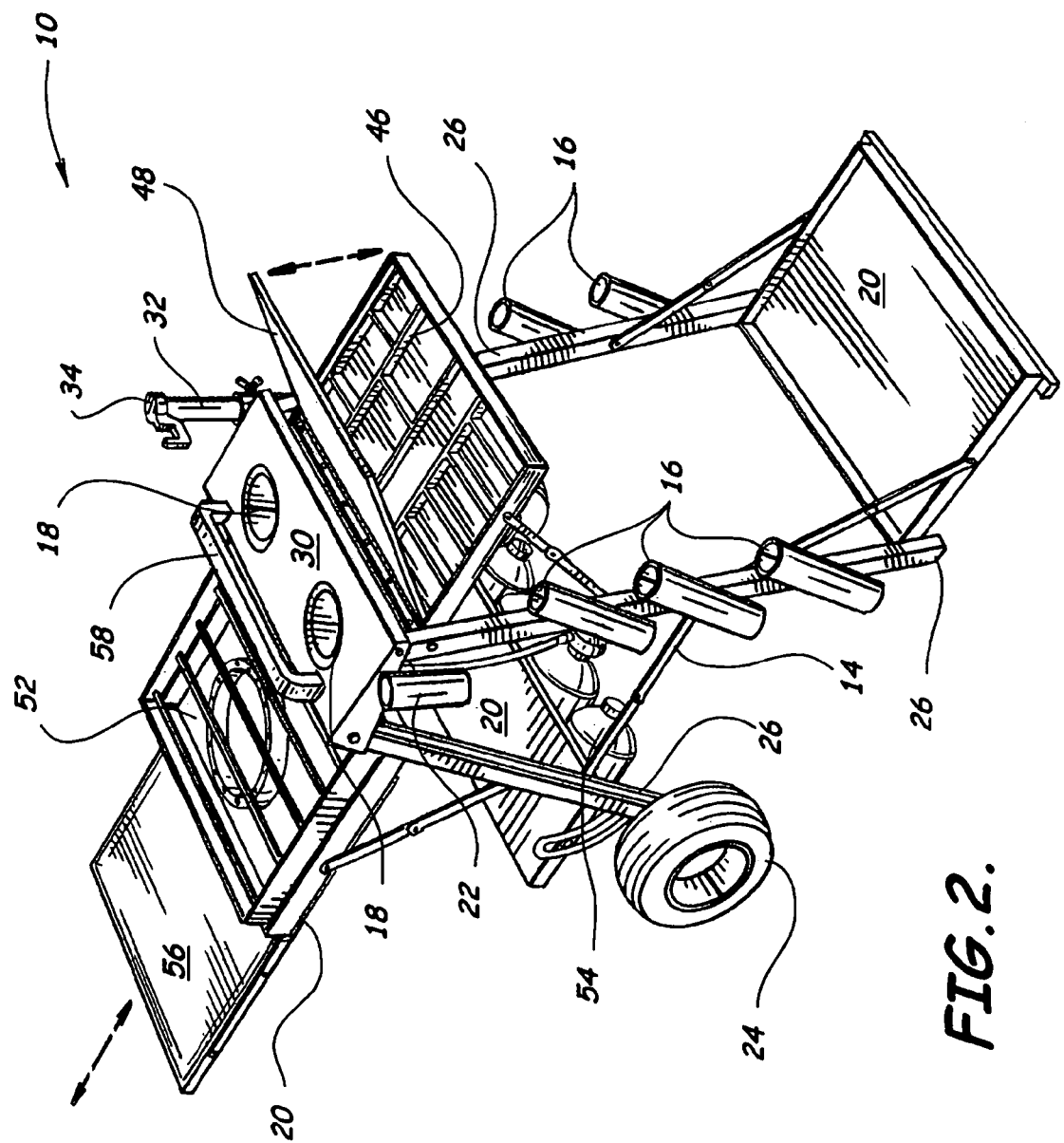
FIG. 2 shows a perspective view of the fishing caddy of FIG. 1.

As noted above, at least one and preferably a plurality of equipment support shelves 20 are positioned along a periphery of the support A-frame so that the shelves are accessible by a user for thereon placing any desired accessory equipment. For example, in one embodiment of the invention, shown in FIGS. 1 and 2, at least one equipment support shelf comprises a storage tray for fishing tackle 46. The tackle storage tray 46 could include a plurality of compartments for organizing fishing lures and other necessaries. The storage tray may be advantageously disposed along an underside of the shelf on sliding tracks so that the fisherman may pull out the tray for use and push it back under the shelf for closing and storage. In addition, this or another equipment support shelf includes a cutting surface 48 useful for cutting bait or for cleaning fish, as seen in the figures. Further, one equipment support shelf comprises sufficient support for placing a cooler 50 thereon, as shown in FIGS. 1 and 6, so that the fisherman may keep bait, food and beverages cold. If the fisherman wishes to be able to cook right on the spot, one or more of the equipment support shelves 20 may be set up for holding a portable stove 52 and a fuel supply 54 therefor, for example, one of the well known camping stoves which uses bottled propane gas as fuel, as illustrated in FIGS. 1, 2 and 6. To go along with the ability to cook, at least one equipment support shelf on the fishing caddy could include a storage tray for cooking utensils 56, as identified in FIG. 2. The skilled will recognize that the utensil storage tray 56 could be disposed similarly to the tackle storage tray, that is, either could be slidably positioned under an equipment support shelf, having a hinged top, or completely being dismountable from the support.

The fishing caddy would typically be stored by the fisherman in a closed position as shown in FIG. 5. That is, the A-frame would be closed in the manner of a common step-ladder, and the equipment support shelves 20 would also be closed by pivoting from an open position extending away from the frame to a closed position lying close to the A-frame. Optionally, a support shelf 20 preferably positioned toward the lower end of the frame 12 could be left in an open position to hold a cooler 50 thereon as the closed A-frame is moved on its wheels in the manner of a typical hand-truck with the cooler or other equipment still loaded. A lower shelf would preferably be sufficiently sturdy to carry not only the cooler in this manner, but also to allow placement of other equipment on top of the cooler for carrying. The skilled will recognize that the fishing caddy 10 does not necessarily require a handle 58 or handles for moving on its wheels, as the fisherman may easily grab the caddy along the A-frame support members. Preferably, however, a handle 58 is provided as shown in FIGS. 1–7.

For use in fishing, the fisherman would typically unload the closed fishing caddy 10 from a vehicle, open one or more of the support shelves, load at least some of the equipment or accessories thereon, and then would roll the fishing caddy with the frame in a closed position to a desired fishing spot. The A-frame 12 would then be deployed by spreading the frame from its closed position to an open position. The remaining equipment support 20 shelves would also be deployed by pivoting outwardly from the support A-frame 12 to their open position, and the accessory equipment brought by the fisherman would then be arranged on the equipment support shelves as desired. If it is sunny and hot, or rainy the fisherman could deploy an umbrella 60 positioned in the umbrella holder 22, so as to obtain protection, as seen in FIG. 6. If it is nighttime, the available lamp holder 32 or 36 could be used for holding a lantern 33, which could be electrical, share fuel with a propane stove 52, or be independently fueled, as shown in the same figure.

Since the fishing caddy 10 may preferably be disposed with a power source 38, for example a twelve-volt battery positioned on one of the support shelves 20, an electrical light source 42 may be connected to the power source for providing electrical lighting. In addition, a typical 12-volt outlet 40 or cigarette lighter, as depicted in FIGS. 3 and 6, may also be connected to the power source 38. In fact, having a 12-volt power source, the variety of electrical accessories which could be combined with the fishing caddy is limited only by the imagination of the fisherman, of course while keeping within the power limitations of the power source. A 12-volt outlet is best disposed with a circuit breaker switch 62, as also shown in FIGS. 3 and 6.

In using the fishing caddy 10, shown in FIG. 1, the fisherman will have lures and other fishing accessories handily available in the fishing tackle storage tray 46 and will be able to place fishing rods in the provided rod holders 16. Bait or fish may be cut on the provided cutting surface 48, preferably a cutting board disposed on one of the equipment support shelves. The skilled will appreciate that the cutting surface may be a cutting board which slides out from under a support shelf, or may be part of another structural feature of the caddy 10, such as the tackle storage tray 46, or the cooking utensil tray 56. Additionally, if the caddy 10 has been provided with a camping stove 52, the fisherman will be able to cook on the spot or even use the stove as a source of heat in cold weather. The cooler 50 and fuel bottles 64, which are preferably positioned on or under support shelves toward the lower end of the frame 12, provide ballast adding stability to the caddy and helping support the umbrella 60 against a breeze and the fishing rods against the pull of a hooked fish.

In the drawing and specification, there have been disclosed a typical preferred embodiment of the invention, and although specific terms are employed, the terms are used in a descriptive sense only and not for purposes of limitation. The invention has been described in considerable detail with specific reference to the illustrated embodiment. It will be apparent, however, that various modifications and changes can be made within the spirit and scope of the invention as described in the foregoing specification and as defined in the appended claims.

That which is claimed:

1. A fishing caddy comprising:
    a support frame having an upper end and a lower end and comprising a plurality of support members pivotably connected at the upper end to form an A-frame;
    a top shelf positioned at the upper end of the support frame so as to provide the pivotal connection between the plurality of support members;
    at least one fishing rod holder;
    at least one beverage holder positioned for holding a beverage container;
    at least one support shelf pivotably connected to a side periphery of said support frame; associated with said at least one support shelf and comprising
    a storage tray having a top surface comprising a cutting board;
    a power outlet connectable to a power source;
    at least one umbrella holder; and
    at least one wheel connected adjacent the lower end so as to make the fishing caddy rollingly movable.

2. The fishing caddy of claim 1, wherein said at least one beverage holder comprises a receptacle positioned on said top shelf.

3. The fishing caddy of claim 1, further comprising a lantern support member positioned to support a lantern thereon.

4. The fishing caddy of claim 1, further comprising a power source having said power outlet connected thereto for providing power.

5. The fishing caddy of claim 1, further comprising a power source and wherein said power outlet further comprises a cigarette lighter connected to said power source.

6. The fishing caddy of claim 1, further comprising a power source and a light source connected to said power source.

7. The fishing caddy of claim 1, further comprising a latch positioned on said support frame for latching the A-frame in a closed position.

8. The fishing caddy of claim 1, wherein said at least one support storage tray is for fishing tackle.

9. The fishing caddy of claim 1, wherein said at least one support shelf further comprises another support shelf providing sufficient support for a cooler.

10. The fishing caddy of claim 1, further comprising a portable stove and a fuel supply therefor.

11. The fishing caddy of claim 1, wherein said at least one support shelf comprises another support shelf providing sufficient support for a portable stove and fuel supply therefor.

12. The fishing caddy of claim 1, wherein said at least one support shelf further comprises a storage tray for utensils.

13. A fishing caddy comprising:
    a support A-frame having an upper end and a lower end and comprising at least two pairs of support members pivotably connected at the upper end to form the A-frame;
    two hinge members spaced apart from the upper end and connecting the two pairs of support members so as to allow the A-frame to be open or closed;
    a plurality of fishing rod holders disposed on said support A-frame for holding fishing rods;
    a plurality of support shelves pivotably connected to said support A-frame for supporting equipment, said plurality of support shelves including a top shelf positioned at the upper end of the support A-frame and side shelves positioned spaced apart along side peripheries of the A-frame;
    a plurality of beverage holders positioned for holding beverage containers therein;
    an umbrella holder disposed for holding an umbrella;
    a power source positioned on a support shelf of said plurality of support shelves and having at least one power outlet or power accessory connected thereto;
    a stove having at least one burner and fuel supply disposed on one or more support shelves of said plurality of support shelves;
    a cooler positioned on a support shelf of said plurality of support shelves; and
    a plurality of wheels connected at the lower end of said support A-frame so as to make the fishing caddy rollingly movable.

14. The fishing caddy of claim 13, wherein said plurality of beverage holders comprises at least one receptacle positioned on said top shelf.

15. The fishing caddy of claim 13, further comprising a lantern support member positioned to suspend a lantern therefrom.

16. The fishing caddy of claim 13, further comprising a cigarette lighter connected to said power source.

17. The fishing caddy of claim 13, further comprising a light source connected to said power source.

18. The fishing caddy of claim 13, further comprising a latch positioned on said support frame for latching the A-frame in a closed position.

19. The fishing caddy of claim 13, further comprising a storage tray disposed underneath an individual support shelf of the plurality of equipment support shelves.

20. The fishing caddy of claim 13, wherein an individual support shelf of the plurality of equipment support shelves further comprises a cutting surface.

* * * * *